United States Patent [19]

Marti et al.

[11] 4,290,062

[45] Sep. 15, 1981

[54] SYSTEM FOR DIGITAL TRANSMISSION AND TEXT DISPLAY

[75] Inventors: Bernard Marti, Noyal-sur-Vilaine; Alain Poignet; Jean-Yves Savary, both of Rennes; Roger Brusq, Betton, all of France

[73] Assignee: Etablissement Public de Diffusion dit Telediffusion de France, Montrouge, France

[21] Appl. No.: 15,959

[22] Filed: Feb. 28, 1979

[30] Foreign Application Priority Data

Mar. 10, 1978 [FR] France ................................ 78 07551

[51] Int. Cl.³ .............................................. G06F 3/14
[52] U.S. Cl. .................................... 340/721; 340/735; 340/750; 340/790
[58] Field of Search ............... 340/721, 735, 790, 744, 340/748, 750

[56] References Cited

U.S. PATENT DOCUMENTS

| | | | |
|---|---|---|---|
| 3,396,377 | 8/1968 | Strout | 340/790 |
| 3,614,767 | 10/1971 | Carrell | 340/790 |
| 4,122,533 | 10/1978 | Kubinak | 340/790 |

FOREIGN PATENT DOCUMENTS 584321  8/1974  U.S.S.R. ............................. 340/790

Primary Examiner—Marshall M. Curtis
Attorney, Agent, or Firm—Laff, Whitesel & Rockman

[57] ABSTRACT

A system for transmission and display of texts on a television screen enables a display of a magazine made up of several pages. The packets of data relative to one page are transmitted without being multiplexed with the packets from another page of the same magazine. The data of one page begins with a page flag which is followed by data indicating the number of the page and ends with the flag of the following page. The data from each page is grouped in rows, preceded by a row flag.

Each page contains an order row of the data which is operation data and is not used for display. Certain pages contain only the data which is relative to the shape of characters of the alphabet and the pages are not for display. They include in their order rows a specific operation octet which is recognized in the receiver. Responsive to this page, the system switches the subsequent data from the alphabet page towards the writing circuit of one of many shape memories, in order to record there the character shape data.

13 Claims, 5 Drawing Figures

SYSTEM FOR DIGITAL TRANSMISSION AND TEXT DISPLAY

The present invention relates to improvements in systems for digital transmission and text display on a television screen. In the following description, such systems will be referred to in an abbreviated form as "teletext systems".

There are already teletext systems in existence, such as for example, those which are described in the French patent application filed on Sept. 6, 1976 under the National Registration No. 76 27212 (U.S. patent application Ser. No. 830,165, filed Sept. 2, 1977) in the joint names of Télédiffusion de France, Le Marouille and Fournier, and in the French patent application filed on Sept. 22, 1976 under the National Registration No. 76 29034 (U.S. application Ser. No. 833,157, filed Sept. 14, 1977) in the joint names of Telediffusion de France and the French State.

In the teletext system described in these patent applications, a signal source broadcasts or transmits digital data in the form of packets of binary elements. The data may originate from any of several different channels. The series of packets from one channel constitutes a magazine which can be made up of several pages. The packets of data originating from different channels may be coded and multiplexed as described in the French patent application filed on June 6, 1975 in the joint names of Télédiffusion de France and the French State, published under the No. 2 313 825 (U.S. Pat. No. 4,058,830) and entitled "Data Broadcasting System". The packets belonging to one page of a magazine are not multiplexed with the packets from the other pages of the same magazine. The data of one page begins with a page flag which is followed by data indicating the number of the page and ending with the flag for the following page. The data for each page is grouped in rows, The term row which corresponds to one line of characters in a page, is used to avoid any confusion giving the television scanning lines. The data of each row is preceded by a row flag with the number of the row in question, and followed by another row flag.

In each receiver of the system, a decoding key is at the disposal of the subscriber in order to allow give him access to the packets of one channel, the packets of the other channels being cancelled out. Thus, an operation of the key enables reception of all the packets of a magazine that the source broadcasts periodically. In addition, the receiver incorporates a key-board on which the subscriber can register the number of a page of the magazine in such a way that only the data relative to the selected page is transmitted to the character generator of the receiver.

In the French patent application Ser. No. 76 29034 (U.S. application Ser. No. 833,157, filed Sept. 14, 1977) mentioned above, an arrangement of the transmitted signals and of the means in each data receiver of the system which has been described, allows variations to be made in the presentation of the texts displayed on the television screens in order to relieve the monotony of the text presentations. These variations may relate to the colour of the characters, the colour of the background on which the characters are written, the flashing of certain characters, and to the modifications in the height and width of the characters, etc. But, more particularly, these variations may relate to the shape of the characters by providing, in the teletext receiver, several character generator read-only memories.

It should be remembered that a character generator for forming a display of characters on a cathode ray tube television screen usually includes a read-only memory linked to a changeable memory. The read-only memory contains information relating to the shape of each character to be displayed. The changeable memory contains the character codes, including the blanks separating the words, which make up the text to be displayed. In the changeable memory, the characters are stored at addresses which correspond to the geographical positions of the characters on the page.

The display operation includes a sequential reading of the rows of character codes of the changeable memory. Each reading of a character code involves, as is already known, the reading by scanning of the shape of the character corresponding to the code in the read-only memory. If a character occupies ten successive television scanning lines, each row of codes in the changeable memory is read ten times. This reading involves referring ten times in succession to the shapes of the characters of the row which are scanned each time at a different place, that is to say at a different address amongst ten possible addresses. The scanning is obviously controlled by clocks which are controlled by the synchro-line of the display tube.

The signals resulting from the scanning of a character shape are delivered in parallel, then converted to a series mode in a shift register where the loading signal frequency is controlled by a clock which is controlled by the synchro-line of the display tube. The output of the shift register is controlled with a multiple frequency of the loading frequency. The multiplication factor is equal to the number of points occupied by each character on a television line. The output signal is transmitted to the television tube where it appears as a luminance signal.

In the French patent application No. 76 29034 (U.S. application Ser. No. 833,157, filed Sept. 14, 1977) mentioned above, several read-only memories are linked to one changeable memory. Each read-only memory contains a set of characters belonging to one type or to one alphabet. The series of octets constituting the data transmitted to the data receiver includes pattern identification octets followed by a sequence of characters to be displayed, having the same pattern as the preceding identification octets. The pattern identification octets are stored in the memory, on reception, and are preceded by a release octet. Each receiver of the system includes, in addition to the first standard changeable memory storing the character octets, a second changeable memory storing the pattern identification octets at the same addresses as those addresses of the character octets of the associated sequence in the first changeable memory. The reading for display of the first changeable memory is carried out at the same time as the reading of the second changeable memory. The output signal designates one of the read-only memories as that in which the shape of the characters must be read when the codes are read in the first changeable memory.

Furthermore, it must be remembered, that in the character transmission systems in which each character is represented by an octet, that is to say a series of eight binary elements or bits, the code ASCII is generally used. Among the eight bits, one binary element or bit is, in principle, reserved for odd-even check. The seven other bits offer 128 possibilities. Among these 128 possibilities, certain ones are reserved for transmission of character codes, others for function codes. Once stored in the changeable memory, the seven bits, which form what is referred to in the following as a word, provide 128 distinct forms of the character generator to be addressed. The standards in force are provided for various methods (release, accentuation) for transmission of additional characters whose shapes may be found in the read-only memory, at addresses corresponding to codes reserved for functions. As far as these standards are concerned, it would be useful to refer to the technical article "Preliminary Specification of the Teletext System ANTIOPE" by C. Schwartz, B. Marti and A. Poignet, which appeared in the French Publication "RADIODIFFUSION-TELEVISION", Volume 47, April–May 1977.

In practice, in a receiver such as the one described in the above-mentioned French patent application No. 76 29034 (U.S. application Ser. No. 833,157, filed Sept. 14, 1977), each read-only memory of the character generator contains the shapes of the letters of an alphabet. The number of alphabets which may be used in a teletext service may be more than two or three. However it is not possible to increase the read-only memories in the character generators for obvious reasons of cost.

Furthermore, the alphabets includes variants. Thus, the Latin alphabet in all its variants, with accented letters, figures and punctuation marks, represents more than 200 different signs. The Cyrillic alphabet, with its national variants, Azerbaijani and Uzbek, requires about 50 additional signs. The Greek alphabet requires about 50 different forms and the Arab alphabet includes 28 letters, each one having four possible distinct forms depending on whether it is positioned at the beginning, in the middle, or at the end of the word, or even whether it is used on its own.

An object of the present invention comprises providing a teletext system for use in receivers, in which the character generators include, in addition to some conventional read-only memories, a provisional memory which, in the reading mode, is used as a standard read-only memory, but whose contents may be modified depending on the messages transmitted by the teletext system.

It will be shown that once the above-mentioned object is attained, the teletext service becomes extremely flexible. Furthermore, it may be possible to meet the requirements of Oriental languages like Chinese or Japanese which contain several thousand ideograms, by using a character memory whose content is variable. By analogy, it also becomes possible to use graphic symbols, such as those used in railway indicators or hotel reservation services.

In fact, the French patent published under the No. 2,331,922, already envisages extending the possibilities of the system known under the name of CEEFAX, by transmitting character shape data to be written in a provisional memory, which is read for these characters, instead of the standard read-only memory of the character generator. However, in the system described in this patent, only a small amount of character shape data can be transmitted. An entire alphabet cannot be transmitted, as the transmission is carried out in the course of a part of a page line which is not displayed. Furthermore, the choice of which memory, read-only or changeable, to read for the display of the character is only determined by the value of one parity bit linked to the character code.

An object of the present invention comprises providing a text transmission and display system which allows a complete alphabet or its equivalent to be recorded in a provisional memory of a character generator.

According to a characteristic of the present invention, a system is provided for transmission and display of texts on a television screen. The emitting station broadcasts, in the form of packets, data originating from several channels. It is possible to time multiplex the packets from the different channels, each packet including a prefix for enabling a receiver to accept packets from one channel and to reject those from the others. The series of packets from one channel constitute a magazine made up of several pages. The packets relative to one page are transmitted without being multiplexed with packets from another page of the same magazine. The data of one page begin with a page flag followed by data indicating the number of the page and ending with the following page flag. The data of each page are grouped in rows, the data of each row being preceded by a row flag with the number of the row and followed by a row flag. Each page includes an order row 0, of which the data is operation data which is not for display. Certain pages are entirely composed of data relating to the shape of alphabet characters. These so-called alphabet pages are not displayed. They include in their row 0 a specific operation octet which is recognised by the receiver. Upon recognition, the receiver switches the subsequent data from the alphabet page, not towards the circuits for reading the character shape memories of the character generator of the receiver, but towards the writing circuit of one of these shape memories, in order to record there the character shape data.

According to another characteristic of the invention, the data relative to each character is grouped between two character flags, which may be identical to the row flags. Each character flag is followed by the address of the matrix of the associated shape memory, the point data of the matrix being grouped in lines.

According to another characteristic of the invention, the point data of one matrix line is preceded by the address of the line in the matrix.

According to another characteristic of the invention, the operation data of the order row 0 of one alphabet page includes the alphabet identification number transmitted on the page, which is stored in a memory register.

According to another characteristic of the invention, the operation data of the order row 0 of a page to be displayed, in which certain characters formed the subject of a transmission on an alphabet page, include the number of the alphabet from which these characters originate. Thus number is compared with the number stored in the memory register. There is a validation of the rest of the page when the result of the comparison is positive.

According to another characteristic of the invention, the coincidence between the positive comparison and the recognition of a transmitted alphabet number initiates the selection, in the character generator of the receiver, of the memory provided for reception of the character shapes of the alphabet transmitted.

According to another characteristic of the invention, in whichever alphabet is used, each of the letters of the same shape having the same phonetic signification have their shape stored in one matrix of a character generator memory. The change from one alaphabet to another activates, between the switching circuit and the character code memory, a code converter which modifies the address to be stored in the code memory when a letter of a particular shape corresponding to the alphabet must correspond to a certain code.

According to another characteristic of the invention, the operation data of the row O, of each page to be displayed, includes a number directly designating the read-only memory of the character generator containing the shapes of the letters which are going to be most frequently used on the rest of the page. The recognition of such a number, with the assistance of a comparator provided for this purpose, validates the rest of the data on the page with a view to their display on the screen of a receiver.

The characteristics of the present invention mentioned above, as well as others, will be shown more clearly in the following description of embodiments, the description being made with reference to the attached drawings, in which.

Figure 1:
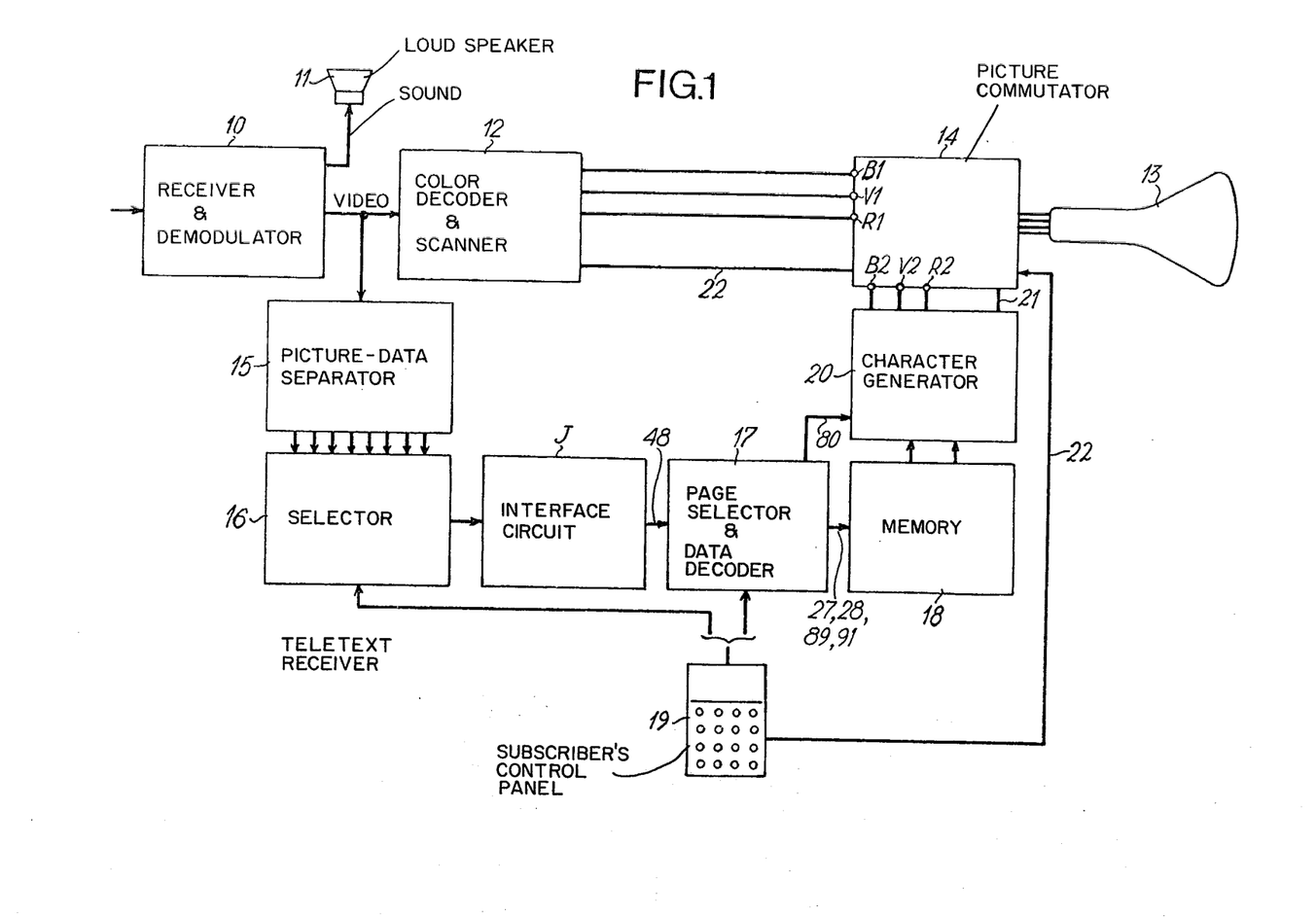
FIG. 1 is a general block diagram of a teletext system receiver according to the invention.

The overall structure of the receiver in FIG. 1 is perceptibly identical to the receivers described in the abovementioned, patent applications Ser. No. 76 27212 (U.S. patent application Ser. No. 830,165, filed Sept. 2, 1977) and No. 76 29034 (U.S. application Ser. No. 833,157, filed Sept. 14, 1977), and reference may usefully be made to the descriptions therein, but upon close examination, there are certain differences which are the object of the present invention.

The receiver in FIG. 1 includes, as in a standard television receiver, a reception and demodulation circuit 10 emitting, on the one hand, the sound through a loudspeaker 11 and, on the other hand, the picture to a colour decoder and scanning generator 12. The colour signals B1, V1 and R1, as well as the luminance emitted from 12, are not transmitted, as in a standard television receiver, directly to the tube 13, but are transmitted via a picture commutator 14 which also adapts the voltage/light characteristic of the tube to the control of synthesized signals.

The terminal in FIG. 1 includes, in addition, a picturedata separator 15, the input of which is connected to the video output of the circuit 10 and the output of which is connected to an initial selection block 16, similar to the terminal equipment described in the French patent application published under the No. 2 313 825 (U.S. Pat. No. 4,058,030), mentioned above. The output of the block 16 is connected, via an interface J to a page selector and data decoding block 17 the output of which is connected to a circuit 18. A subscriber keyboard 19 has outputs connected appropriately to the control inputs of the blocks 16 and 17. The output of the circuit 18 is connected to the input of a character generator 20. The outputs of the signals from the generator 20 are connected to the colour inputs R2, V2 and B2 of the picture commutator 14, as well as to the luminance input 21. A control output 22 from the keyboard 19 is also connected to the switching input of the commutator 14.

It should be noted that the interface J is preferably of the type that is described in the French patent published under the French Pat. No. 2 268 308 and bearing the national registration No. 74 13136. It allows asynchronous operation between selectors 16 and 17. On the other hand, its input may, in a variant, be connected to a teletext distribution network with a wire link.

In the separator 15, an oscillator restores the frequency rhythm of the binary elements or bits. The standard processing circuits process the bits grouped in octets, as is shown in the French patent application Ser. No. 2 313 825 (U.S. Pat. No. 4,058,830) meantioned above, and, notably with regard to the validation by a key of the channel requested by the subscriber, with reference to FIG. 6 of this patent application.

Assuming that this validation is positive, the data received is directed to the block 17 via the interface circuit J. In practice, in the embodiment described, a channel is equivalent to a magazine. The block 17, as will be seen in more detail with reference to FIG. 7, incorporates means for recognition of the page flag octets and the means of comparison. Each time that the preceding recognition is positive, block 17 compares the page number octets which follow with the page number requested and registered on the keyboard 19 by the subscriber. When this comparison is negative, the octets received and the following ones are eliminated until the next following recognition of a page flag. When the comparison is positive, under certain conditions which will be described with reference to the diagram in FIG. 7, the octets received (until the next page flag) are transmitted to the circuit 18 after having been put into order by suitable means, as is described in the patent application Ser. No. 76 27212 mentioned above. When the comparison is positive, under different conditions, the octets undergo additional processing in circuit 17, as will be seen in the following.

Figure 6:
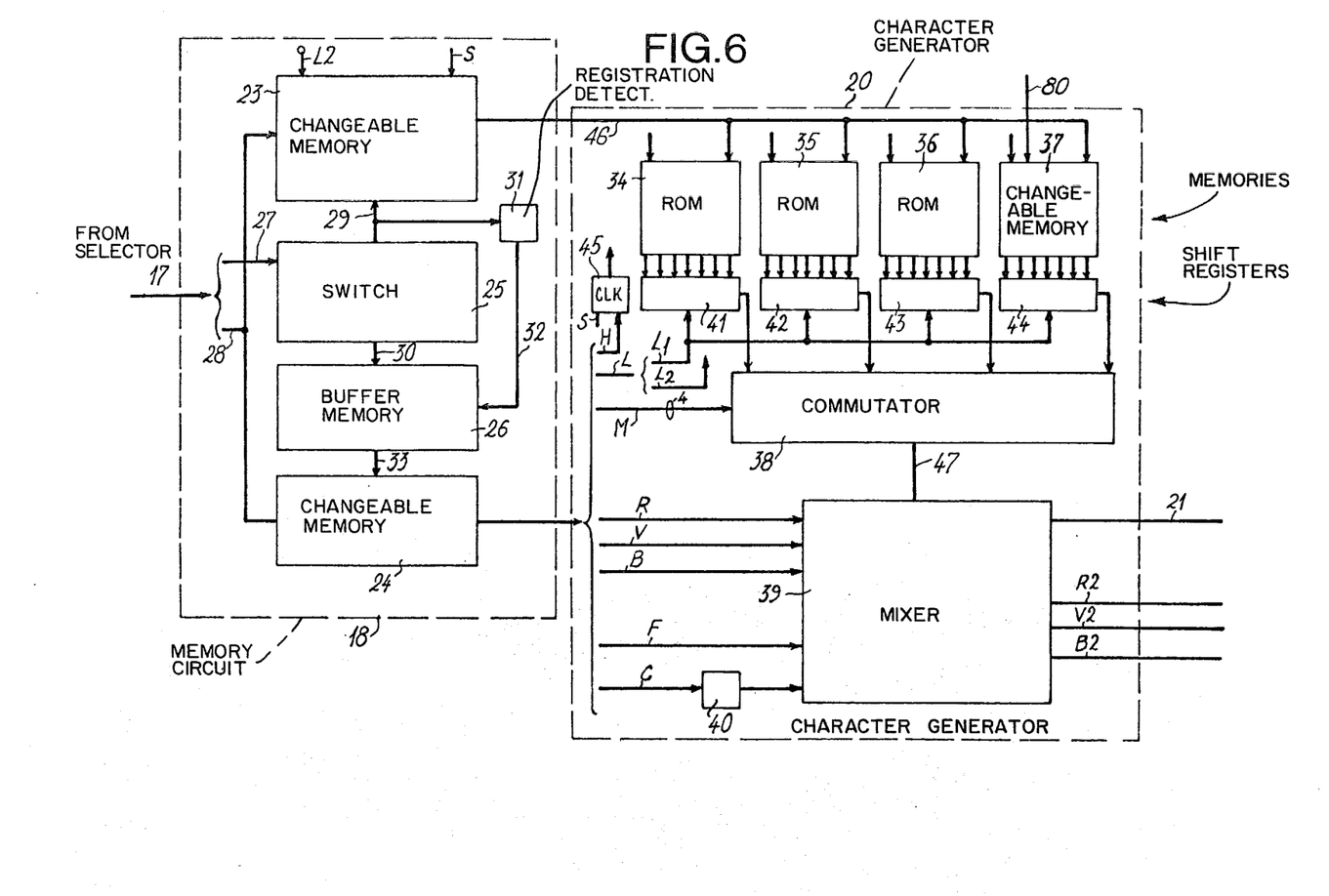
FIG. 6 is a block diagram of the memory and character generator circuits to be used in the receiver in FIG. 1.

In the embodiment described, the memory block or circuit 18 and the character generator 20 are constituted as is shown in more detail in FIG. 6. Memory 18 includes in practice two changeable memories 23 and 24, as well as a switching circuit 25 and a buffer memory 26. The input of the switching circuit 25 is connected via the link 27 to the output of circuit 17, FIGS. 1 and 7, which delivers the character and function octets of the rows. The row address inputs of the memories 23 and 24 are connected, in parallel, by the link 28 to the output of circuit 17 which delivers the row numbers. The switching circuit 25 has one output 29 connected to the data input of the memory 23 and one output connected to the input of the buffer memory 26. The output of the buffer memory 26 is connected to the data input of the memory 24.

The data liable to be applied via link 27 to the input of the switching circuit 25 can be arranged in the following groups: first of all, the most simple case, an alphanumerical character octet, then a standard function octet, and finally, a release octet and a character pattern identification octet. The switching circuit 25 includes means of detection, allowing a recognition of the data of the third group—release octet plus pattern identification octet. These means can be simple comparators. The switching circuit enables the signals to be directed towards its output 30, whereas the octets of the other groups are directed towards its output 29.

The input of a circuit 31 is connected to memory data input 29 and its output is connected to the reading input of the buffer memory 26. It detects the registration of the character octets in the memory 23 and controls the registration, at the same address as each of its character octets, of the pattern identification octets which precede them from the memory 26 into the memory 24. The readout of memory 26 into memory 24 does not cancel the contents of memory 26. The registration detection circuit 31 is connected to buffer memory 26 via the control link 32 and 26 is connected to memory 24 via the link 33.

The functioning of the circuits 23 to 26 has already been described in the French patent application No. 76 29034. Since it is not an object of the present invention, it will not be described in more detail.

The character generator 20 in FIG. 6 includes four memories 34 to 37, three of which are standard read-only memories 34 to 36 and the fourth 37 is a volatile memory, a commutator 38, a mixing circuit 39 and a monovibrator circuit 40. The output of each memory 34 to 37 is connected to a shift register 41 to 44 which are parallel to series converters. It should be remembered that the scanning of character shapes is carried out in the memories 34 to 37, line by line. Each line corresponds in principle to a television screen line. A clock 45 is also provided to control the reading of the memories 34 to 37 depending on the synchronisation line signals of the television tube. In FIG. 6 certain inputs S have been indicated to show that the synchronisation line is used for reading the memories concerned or to control the repetitive operations; however, in order to simplify the drawing not all the S inputs are indicated.

Instead of using four shift registers 41 to 44, one single register could be used and a selector provided allowing inhibition of the outputs of the memories 34 to 37 instead of the commutator 38.

The reading output of the changeable memory 23 is connected in parallel via link 46 to the reading address inputs of the memories 34 to 37 of which the parallel data outputs are connected respectively to the parallel inputs of the registers 41 to 44.

The reading output of the changeable memory 24 includes as many wires as there are significant binary elements in the pattern identification octets. Thus, the wires R, V, B corresponding respectively to the three basic colours are indicated. The wire H corresponds to the height of the characters displayed, the wire L to the width of the characters displayed, the wire F to the change or no change of background and the wire C to flashing. In addition, there is a link M containing four conductors corresponding to the choice of the memory 34 to 37 which is selected to emit the type of character. The functions of the output wires of the memory 24 have already been described in the patent application Ser. No. 76 29034 mentioned above, to which reference should be made, and in the following description, only the link M will be considered in more detail.

The link M controls the commutator 38 which selects one of the registers 41 to 44 to connect with its output 47 and thereby forward signals towards the mixing circuit 39

Figure 4:
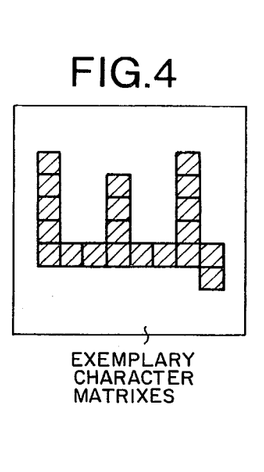
Figure 5:
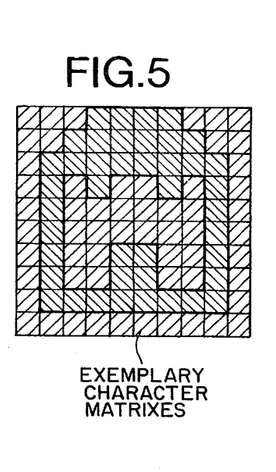

Memory 37 is a changeable memory which, in the examples described, is divided into zones in which binary elements corresponding to square matrixes of 100 points are recorded, such as those which are shown in FIGS. 2 to 5. If we consider the matrix in FIG. 2 for example, which represents a capital letter A of the Latin alphabet; it appears that this includes ten lines with a first line corresponding to the binary word 0001110000, a second line corresponding to the binary word 0010001000, etc., each word containing ten bits. By studying the matrix in FIG. 3 which represents a small letter g of the Latin alphabet, it is easy to draw up the series of ten words of ten bits that must be recorded in the memory 37 (FIG. 6) in order for it to used in a character generator. As an example, the matrix in FIG. 4 represents a small Cyrillic letter and the matrix in FIG. 5 represents a symbol used to indicate that railway or hotel is available information.

As it is assumed that the memory 37, like the memories 34 to 36, is capable of recording 128 character shapes. This memory includes 128 zones which can be addressed, in the writing mode as well as in the reading mode, by a binary word of seven bits which defines the address. As each zone includes ten sub-zones of ten bits, a word of four bits defining the address of the sub-zone must be provided.

Figure 7:
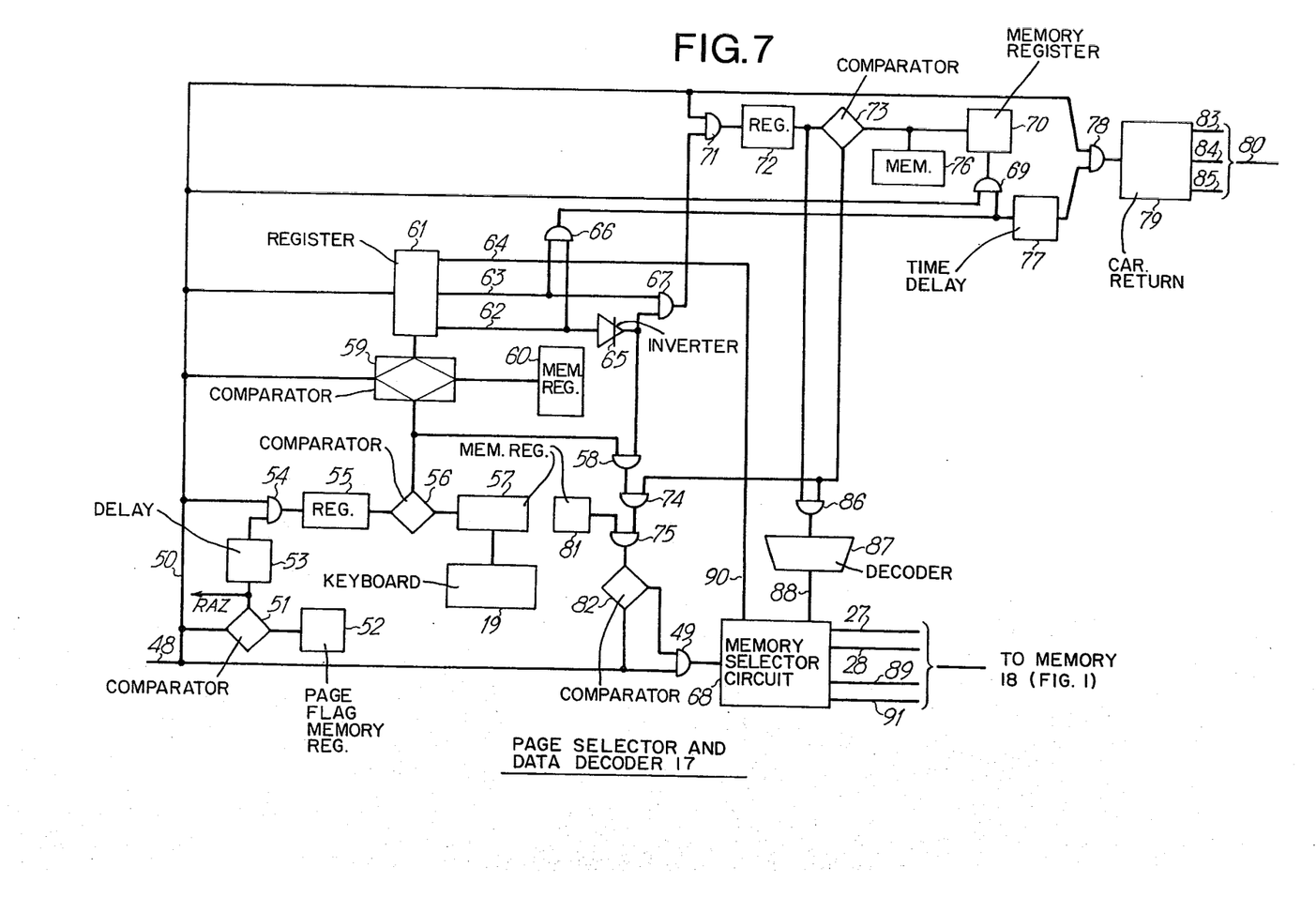
FIG. 7 is the diagram of a page selector and data decoder to be used in the receiver in FIG. 1.

The following is a description of FIG. 7 which shows in detail the selector on page 17. The octets originating from interface circuit J enter the selector circuit 17 via the link 48 which feeds, in parallel, the first input of an AND gate 49 and a link 50. The link 50 is connected to the first input of a comparator 51 of which the second input is connected to the output of a memory register 52 containing the octet designating a page flag. The output of comparator 15 is connected to a time delay circuit 53 the output of which remains activated for the duration of three octets, when it has been triggered by the comparator 51.

The output of time delay 53 is connected to the first input of an AND gate 54 of which the second input is connected to the link 50. The output of AND gate 54 is connected to the input of a register 55 capable of storing three octets. The output of the register 55 is connected to the first input of a comparator 56 the second input of which is connected to the output of a memory register 57 containing three octets corresponding to the number of the page that the subscriber has requested on his keyboard 19.

The output of the comparator 56 is connected, on the one hand, to the first input of an AND gate 58 and, on the other hand, to the trigger input of a comparator 59. The first signal input of comparator 59 is connected to the link 50 and the second signal input to the output of a memory register 60 containing the octet designating a row flag, two octets containing the figures 0 and another octet which has no significance insofar as this invention is concerned. The output of the comparator 59 is connected to the activation input of a register 61 the signal input of which is connected to the link 50.

The register 61 includes four cells for storing the four significant binary elements of the octet which it receives from link 50 as soon as its input connected to 59 is activated. The output of the first cell 62 of register 61 is connected on the one hand, to the input of an inverter 65 of which the output is connected to the second input of the AND gate 58. On the other hand, the register 61 output 62 is also connected to the first input of an AND gate 66. The output 63 of the second cell of register 61 is connected on the one hand, to the second input of the AND gate 66 and on the other hand, to the first input of an AND gate 67. The second input of AND gate 67 is also connected to the output of the inverter 65. The output 64 of the fourth cell of register 61 is connected to a control input of a memory selector circuit 68 whose function will be seen in the following. The output of the AND gate 66 is connected to the first input of an AND gate 69 the second input of which is connected to the page, the series of data necessary for the recording of an alphabet fitting onto one page. Such a page may be as follows:

---

"PAGE" "2" "1" "4" "ROW" "O" "O" "P0000" P"1100"
"1" "5"
"CARRIAGE RETURN" "DLE" "ROW" "A" "O" "Q00011" "Q10000" "1"
"Q00100" "Q01000" "2" "Q01000" "Q00100" . . . "6" "Q01000"
"Q00100"
"7" "Q00000" "Q00000" . . . "9" "Q00000" "Q00000" "DLE"
"RA GEE"
"B" "O" . . . . . . . . . . "PAGE" . . . .

--- link 50 and the output of which is connected to the input of a memory register 70. The output of the AND gate 67 is connected to the first input of an AND gate 71 the second input of which is connected to the link 50 and the output of which is connected to the input of a register 72.

The output of the memory register 70 is connected to the first input of a comparator 73 the second input of which is connected to the output of the register 72. The output of comparator 73 is connected to the first input of an AND gate 74 the second input of which is connected to the output of the AND gate 58. The output of AND gate 74 is connected to the first input of an AND gate 75. Furthermore, the first input of the comparator 73 is also connected to the output of a memory 76 containing the figures 01, 02 and 03 corresponding to the alphabets contained in the read only memories 34 to 36.

The comparator 73 is able to compare successively the contents of memory 76 and register 70 with the contents of register 72 comparator 73 activates its output when there is agreement at its two inputs. The output of the AND gate 66 is also connected to the input of a time delay circuit 77. The time delay duration of circuit 77 is two octets. The output of circuit 77 is connected to the first input of an AND gate 78 the second input of which is connected to the link 50. The output of AND gate 78 is connected to the input of a circuit 79 whose function will be seen in the following. The outputs of the circuit 79 are connected via a link 80 to the memory 37 (FIG. 6).

The second input of the AND gate 75 is connected to the output of a memory register 81 containing the octet "CARRIAGE RETURN." The output of AND gate 75 is connected to the first input of a comparator 82. The second input of the comparator 82 is connected to the link 48 whereas its output is connected to the first input of the AND gate 49 the second input of which is connected to the link 48. The output of AND gate 49 is connected to the signal input of the circuit 68. The outputs of the circuit 68 constitute the links 27 and 28 extending towards memory 18 (FIG. 1).

The functioning of the circuit in FIG. 7 will now be described by taking three examples of messages transmitted by the teletext system. Firstly, a message may contain an alphabet to be recorded in the memory 37, FIG. 6. Next a page for display may be written with one of the alphabets of the memory 34 to 36 of the character generator 20. Finally, a page to display may be written with an alphabet stored in the changeable memory 37 (FIG. 1).

1ST EXAMPLE

Message of alphabet to be recorded in changeable memory 37 (FIG. 6)

In the teletext system according to the invention, such a message is transmitted like a normal magazine page, the series of data necessary for the recording of an alphabet fitting onto one page. Such a page may be as follows:

In this message each octet appears between two inverted comma signs. The octet "PAGE" designates the page flag. A single figure in an octet indicates the digital value in decimals of the octet. The octet "ROW" designates the row flag. The letter P followed by binary digits 1 and 0 indicates the binary elements of the octet allowing detection and correction of errors in transmission, whereas the bits which follow constitute useful data. The octet "CARRIAGE RETURN" designates the end of the operation data. The octet "DLE" designates, when it is followed by the octet "ROW", that the data which follows until the next "DLE" "ROW" combination are relative to one character of the alphabet. A single letter in an octet indicates the address of the unitary matrix in the memory 37 in which the character must be recorded.

In the example above, to facilitate description, each letter is a Latin letter. The Latin alphabet will, in practice in the Western countries, be stored in one of the read only memories 34 to 36. The letter Q followed by five binary digits has the same function as P, seen above, whereas the bits 1 indicate the positions of the blanks in each matrix line.

Figure 2:
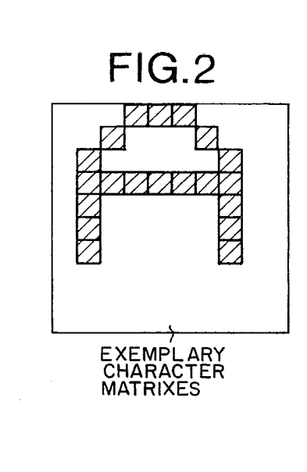
FIGS. 2-5 are examples of signs arranged in unitary matrixes for illustration of the functioning of the teletext system according to the invention.
Figure 3:
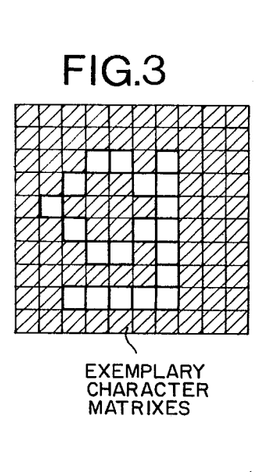

In a matrix, such as that in FIG. 2, which represents an A, that is the first character whose composition is transmitted in the above message, each line is described by ten bits. In the message, it is assumed that these ten bits are separated into two lots of five bits which form two successive octets with the bits of Q. After the octet for character "A", an octet "0" is found indicating that the two octets which follow describe the line 0 of the matrix in FIG. 2. Then, there is an octet "1" indicating that the two octets which follow describe the line 1, etc. It can be noted that, for the lines 7 to 9, the line octets may include 0's. This is why, in a variant, the descriptions of these empty lines are not transmitted. If, in the course of the message, one of the line description octets corresponds to the octet "DLE", it is of course doubled on emission to fulfil the rules of the art.

In the circuit in FIG. 7, when a "PAGE" octet is sent via link 50 to the comparator 51, it coincides with the contents of register 52 and comparator 51 triggers delay circuit 53. The three following octets "2" "1" "4" indicating the number of the page transmitted are introduced in register 55, via AND gate 54, for comparison in 56 comparator with the contents of 57 which constitutes the number of the page requested by the subscriber.

When they coincide, the input of the comparator 59 is activated. This causes the following octets to be compared in succession with those which are in the memory 60, that is to say the octets "ROW" "0" "0" and "P0000". When they coincide, this indicates that the operation data of the row 0 are going to follow. Furthermore, the output of comparator 56 activates the first input of the AND gate 58. The octet P1100, at least as far as the last four bits are concerned, arrives at the register 61. In the example described, the outputs 62 and 63 are activated, thus inhibiting the gate 58, via the inverter 65. However, outputs 62,63 open the gate 66 which opens the gate 69. Therefore, the gate 58 inhibits, through gates 74, 75 and comparator 82, the gate 49 which means that the page will not be displayed. Furthermore, the gate 69, when open, allows the introduction of the two following octets "1" and "5" into the memory register 70 where they will indicate that the alphabet to be recorded carries the number 15" in the particular example described. Furthermore, after a delay of two octets, the gate 78 allows the rest of the message to enter the carriage return circuit 79 until a new page flag reaches the comparator 51 which then, via its reset output RAZ returns all the circuits of page selector and data decoder 17 (FIG. 7) except memory registers 57 and 70 to their initial status.

In the carriage return circuit 79, the reception of the octet "CARRIAGE RETURN" triggers the operation of the circuit. After each "DLE" "ROW" combination received and recognised in a comparator of the carriage return circuit 79, the octet of the following character determines the address of the unitary matrix of memory 37 (FIG. 6) in which the shape of the following character is going to be recorded. This address is transmitted via link 83 (FIG. 7) towards 80 which extends into FIG. 6. Then, the octet of the following line determines the line of the matrix where the bits 1 of the shape are going to be recorded. This address is transmitted via links 84 toward 80 and FIG. 6. Finally, the ten significant bits of the line are transmitted, after decoding of the two following octets, via link 85 towards 80 and FIG. 6. At the writing input of the memory 37 (FIG. 6), the addresses transmitted via links 83 and 84 serve as writing addresses for the ten bits transmitted via link 85, and so on until the last character of the alphabet.

2ND EXAMPLE

Page to be shown with an alphabet from memories 34, 35 or 36 (FIG. 6).

A page of this type has the following structure:

---
"PAGE" "3" "4" "8" ROW" "O" "O" "P0000""P0100" "O" "1"
"CARRIAGE RETURN" "ROW" "X" "Y" "O" "F1" "O" "F2" "CAR"
"CAR"
"CAR".........."PAGE"......
---

If the subscriber has requested number 348 on his keyboard, the functioning of the circuit in FIG. 7 is the same as that described above up to the input of the octet "P0100" in the register 61. In this case, the output 62 is not activated thus opening, via inverter 65, the gate 58 and the output 63 is activated thus opening the gate 67, instead of gate 66. The gate 67 opens the gate 71 and the two following octets indicating the alphabet 01 enter the register 72.

On consulting the memory 76, the comparator 73 ascertains that there is agreement with one of the three instructions recorded and opens the gate 74 the second input of which is connected to AND gate 58. The gate 75 is opened, and, on reception of the octet "CARRIAGE RETURN" via link 48, the comparator 82 opens the gate 49 thus allowing reception of the rest of the page in the circuit 68. Furthermore, the output of the comparator 73 also is connected to the first input of an AND gate 86 the second input of which is connected to the output of the register 72. The AND gate 86 transmits to a decoder 87 the number of the alphabet recorded in register 72. In the example described, the decoder 87 retransmits without modification this number to a control input 88 of a memory selector circuit 68. The circuit 68 transmits the number via link 89 to the memory 24 (FIG. 6) of 18 which selects via link M the memory 34, as the main memory from which the shapes of the characters will be taken.

Furthermore, the memory selector circuit 68, as has already been mentioned with regard to the functioning of the circuit 17 of the receiver described in the patent application Ser. No. 76 27212, detects the row flag octets and decodes the two octets which follow each row octet in order to arrive at the number of the row which is transmitted to memory 18 via link 28 in order to serve as address in memories 23 and 24 (FIG. 6), whereas the other octets of each row are transmitted via link 27 to the selector 25.

3RD EXAMPLE

Page for display with an alphabet in the memory in 37 (FIG. 6).

A page of this kind has the following structure:

---
"PAGE" "8" "5" "7" ROW" "O" "O" "P0000" P0100" "1" "5"
"CARRIAGE RETURN" "ROW" "X" "Y".......
---

If a subscriber has requested the number 857 on his keyboard 19, the functioning of the circuit in FIG. 7 is the same as that which has just been described up to the functioning of the comparator 73, which compares the contents of registers 72 and 70. In the present example, it has already opened the gate 49, via gate 74, etc. But, it also transmits the number "15" to the decoder 87 which arrives at a number 4 to transmit to memory selector circuit 68, via link 88. Consequently via link 89, the memory 24 (FIG. 6) takes the memory 37 as the main memory.

It is evident that the circuit in FIG. 7 allows elimination of mistakes in operation on the part of the subscriber by preventing a display when the alphabet of a page designated by the subscriber does not correspond to that which is recorded in the changeable memory 37 (FIG. 6), or in the memories 34 to 36.

In the event of the alphabet being changed in the course of a page, the procedure described in paragraph 3.2 of the above-mentioned technical article "Preliminary Specification of the ANTIOPE teletext system" or that provided for in the patent application Ser. No. 76 27212 is carried out. In practice, in this case, the fourth octet of the row 00 is the following "P0101". Therefore the output 64 (FIG. 7) of the register 61 is activated and this, in turn, activates the control input 90 of memory selector circuit 68 which transmits via line 91 a signal to the memory 26 (FIG. 6) which, on reception of octets "OUT OF CODE" "SO" and "SI" initiates in memory 24 the selection of the appropriate memory 34 to 37.

In certain cases, an alphabet may call for character shapes, certain of which are in a memory which has been chosen as the main memory (such as 34 (FIG. 6)) and others are in another memory such as 35. This is the case when two alphabets have a relatively large number of common letter shapes, the other shapes being different.

Figure 8:
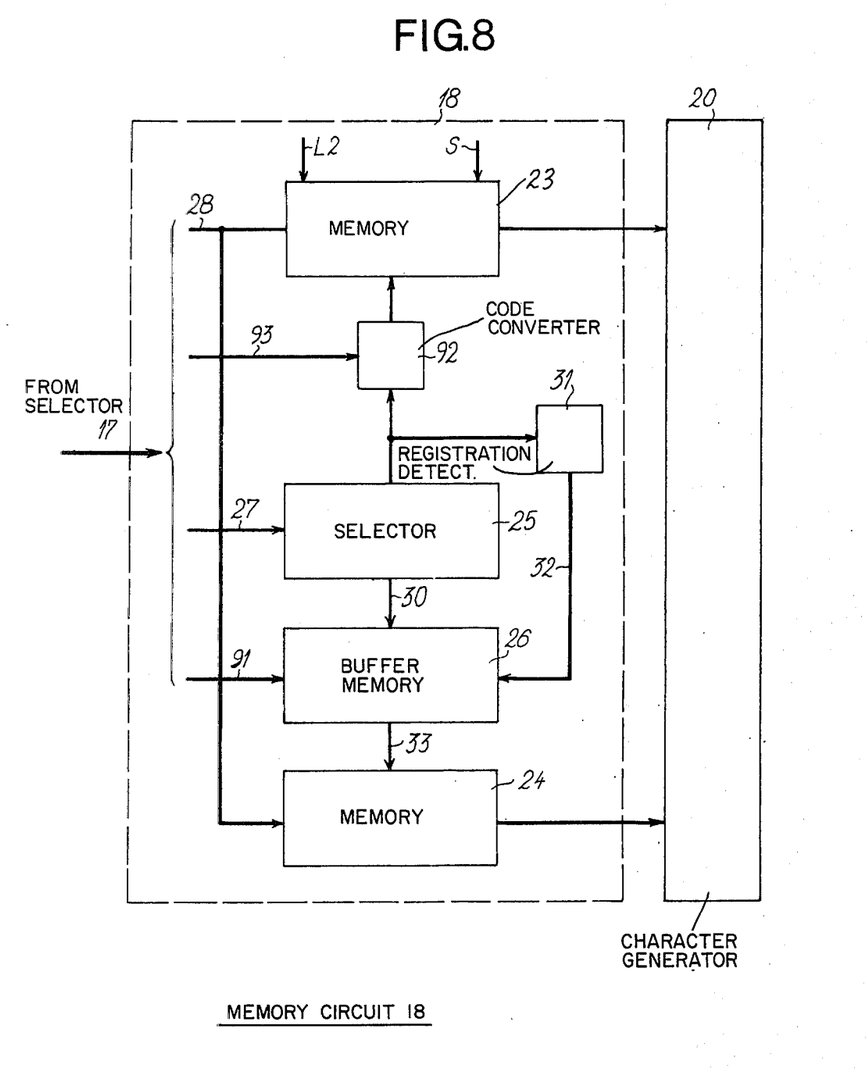
FIG. 8 is the block diagram of a variant of the memory circuit described in relation to FIG. 6.

International standards have been established wherein for example for the Latin and Cyrillic alphabets, the letters of the same shape, such as A, E, O, are not transmitted by using the same codes, that is to say, the same octets, as if they have the same phonetic signification. However, for display, it does not seem necessary to provide storage for the common shapes of these characters in more than one read only memory, for obvious reasons of economy. That is why, in the variant in FIG. 8 a code converter 92 has been provided between the selector 25 and the memory 23. Each time that memory 23 receives one of the characters with a common shape (from selector 25), it transmits via link 93 a zero to the memory 24 which then selects via link (FIG. 6) M, the main read only memory 34. Each time that it receives one of the non-common characters from selector 25, memory 23 transmits via link 93 a 1 to 24 which selects the appropriate read only memory.

We claim:

1. A system for transmission and display of text material on a television screen, wherein the transmitting television station broadcasts data for such displays in the form of data packets sent out over several channels, the packets from the different channels being adapted to be time multiplexed, a series of packets from any one channel constituting a magazine made up of several pages, the packets relative to any one page being transmitted without being multiplexed with the packets from another page one page including an order row of data which is purely operational data that is not used for display, and character shape format control means for use in said system, said character shape format means comprising: a plurality of shape memory means for recording the character shapes transmitted by the system, said one of said pages of transmitted data containing exclusively data relating to the shapes of alphabet characters on the alphabet page which is not for display means for switching the subsequent data of that alphabet page toward a writing circuit, means associated with one of the shape memory means in order to record there the character shape data, and character generator means responsive to said recorded character shape data for generating alphabetical character of a shape selected from said page which is not for display.

2. The system according to claim 1, and a plurality of matrix means associated with said shape memory means, means responsive to the data relative to each character which is grouped between two character flags for addressing one of the matrix means associated with said shape memory means, the point data of the matrix being grouped in lines.

3. The system according to claim 2, and means whereby the point data of one matrix line are preceded by the line address in the matrix.

4. The system according to any one of the claims 1 to 3, and means for storing in a memory register means the operation data of the order row of an alphabet page, said operational data including the identification number of the alphabet transmitted on the page.

5. The system according to claim 4, characterized in that the operation of the order row of a page for display, in which certain characters have formed the subject of transmission in one alphabet page, includes the number of one alphabet containing these characters, and means for comparing the number of said one alphabet with the number stored in said memory register means, and means for validating the rest of the page when the result of the comparison is positive.

6. The system according to claim 5, and means responsive to a coincidence of said positive comparison and a recognition of a transmitted alphabet number for initiating a selection of a character generator means in the memory means for receiving the character shapes of the alphabet transmitted.

7. The system according to any one of the claims 1, 2, or 3, characterized in that whatever the alphabet, the letters of the same shape having the same phonetic signification, each have their shapes stored in one single matrix of a character generator memory, and means responsive to a change from one alphabet to another for activating a code converter between the switching circuit and the character code memory, which modifies the address to be stored in said code memory when a letter of a particular shape corresponding to the alphabet must correspond to a certain code.

8. The system according to any one of the claims 1, 2, or 3, characterized in that the operation data of the order row of each page to be displayed includes a number directly designating a memory means associated with the character generator in which the shapes of the letters are found which are going to be most often used in the rest of the page, and means responsive to the recognition of such a number and including comparator means for initiating, in addition, a validation of the rest of the data of the page with a view to its display on the screen of a receiver.

9. The system according to claim 5, characterized in that whatever the alphabet the letters of the same shape, having the same phonetic signification, each have their shapes stored in one single matrix of a character generator memory, and means responsive to a change from one alphabet to another for activating a code converter between the switching circuit and the character code memory, which modifies the address to be stored in said code memory when a letter of a particular shape corresponding to the alphabet must correspond to a certain code.

10. The system according to claim 6, characterized in that whatever the alphabet the letters of the same shape, having the same phonetic signification, each have their shapes stored in one single matrix of a character generator memory, and means responsive to a change from one alphabet to another for activating a code converter between the switching circuit and the character code memory, which modifies the address to be stored in said code memory when a letter of a particular shape corresponding to the alphabet must correspond to a certain code.

11. The system according to claim 5, characterized in that the operation data of the order row of each page to be displayed includes a number directly designating a memory means associated with the character generator in which the shapes of the letters are found which are going to be most often used in the rest of the page, and means responsive to the recognition of such a number and including comparator means for initiating, in addition, a validation of the rest of the data of the page with a view to its display on the screen of a receiver.

12. The system according to claim 6, characterized in that the operation data of the order row of each page to be displayed includes a number directly designating a memory means associated with the character generator in which the shapes of the letters are found which are going to be most often used in the rest of the page, and means responsive to the recognition of such a number and including comparator means for initiating, in addition, a validation of the rest of the data of the page with a view to its display on the screen of a receiver.

13. The system according to claim 7, characterized in that the operation data of the order row of each page to be displayed includes a number directly designating a memory means associated with the character generator in which the shapes of the letters are found which are going to be most often used in the rest of the page, and means responsive to the recognition of such a number and including comparator means for initiating, in addition, a validation of the rest of the data of the page with a view to its display on the screen of a receiver.

* * * * *

UNITED STATES PATENT AND TRADEMARK OFFICE
CERTIFICATE OF CORRECTION

PATENT NO. : 4,290,062

DATED : September 15, 1981

INVENTOR(S) : BERNARD MARTI, ALAIN POIGNET, JEAN-YVES SAVARY & ROGER BRUSQ

It is certified that error appears in the above—identified patent and that said Letters Patent is hereby corrected as shown below:

Col. 1, Line 40, after "row" insert --,--;

Col. 1, Line 42, "giving" should be --with--;

Col. 1, Line 43, after "flag", "with" should be --giving--;

Col. 1, Line 46, after "to", delete "allow";

Col. 3, Line 4, after "a", "word" should be --"word"--;

Col. 4, Line 26, after "called", "alphabet pages" should be --"alphabet pages"--;

Col. 4, Line 53, "Thus" should be --This--;

Col. 5, Line 58, "4,058,030" should be --4,058,830--;

Col. 6, Line 14, "meantioned" should be --mentioned--;

Col. 8, Line 8, after "to", insert --be--;

Col. 8, Line 12, "is available information" should be --information is available--;

UNITED STATES PATENT AND TRADEMARK OFFICE
CERTIFICATE OF CORRECTION

PATENT NO. : 4,290,062          Page 2 of 2

DATED : September 15, 1981

INVENTOR(S) : BERNARD MARTI, ALAIN POIGNET, JEAN-YVES SAVARY & ROGER BRUSQ

It is certified that error appears in the above—identified patent and that said Letters Patent is hereby corrected as shown below:

Col. 9, Line 32, after "72", "comparator" should be --. Comparator--;

Col. 10, Line 4, (chart line 1) "P "1100" " should be --"p1100"--;

Col. 10, Line 49, "may" should be --only--;

Col. 10, Line 60, "56 comparator" should be --comparator 56--;

Col. 10, Line 60, after "of" insert --memory register--;

Col. 11, Line 13, "15" should be --"15"--;

Col. 12, Line 65, after "via", insert --link--.

Signed and Sealed this

Sixteenth Day of March 1982

[SEAL]

Attest:

GERALD J. MOSSINGHOFF

Attesting Officer     Commissioner of Patents and Trademarks